US012387646B2

(12) United States Patent
Chang et al.

(10) Patent No.: US 12,387,646 B2
(45) Date of Patent: Aug. 12, 2025

(54) DISPLAY PANEL DRIVING METHOD AND DISPLAY DEVICE

(71) Applicant: TCL CHINA STAR OPTOELECTRONICS TECHNOLOGY CO., LTD., Guangdong (CN)

(72) Inventors: Shuming Chang, Guangdong (CN); Zhifu Li, Guangdong (CN); Yu Wu, Guangdong (CN); Tao He, Guangdong (CN); Yating Wen, Guangdong (CN); Weisheng Zheng, Guangdong (CN); Yuning Zhang, Guangdong (CN); Qian Wang, Guangdong (CN); Shijie Deng, Guangdong (CN); Zhaoming Liang, Guangdong (CN); Fan Chen, Guangdong (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/401,349

(22) Filed: Dec. 30, 2023

(65) Prior Publication Data

US 2025/0191506 A1 Jun. 12, 2025

(30) Foreign Application Priority Data

Dec. 8, 2023 (CN) ........................ 202311692040.2

(51) Int. Cl.
*G09G 3/20* (2006.01)

(52) U.S. Cl.
CPC ....... *G09G 3/20* (2013.01); *G09G 2310/0275* (2013.01); *G09G 2330/021* (2013.01); *G09G 2340/0435* (2013.01); *G09G 2360/00* (2013.01)

(58) Field of Classification Search
CPC ............. G09G 3/20; G09G 2310/0275; G09G 2330/021; G09G 2360/00
See application file for complete search history.

(56) References Cited

U.S. PATENT DOCUMENTS

| | | | | |
|---|---|---|---|---|
| 2015/0145901 | A1* | 5/2015 | Lee | G09G 3/3614 345/96 |
| 2022/0293028 | A1* | 9/2022 | Li | G09G 3/20 |
| 2024/0203333 | A1* | 6/2024 | Kim | G09G 3/3208 |

FOREIGN PATENT DOCUMENTS

| | | | |
|---|---|---|---|
| CN | 104681000 B | * | 7/2018 |
| CN | 115909966 B | * | 11/2023 |
| WO | 2022045799 A1 | | 3/2022 |

OTHER PUBLICATIONS

English translation of CN-115909966-B (Year: 2023).*
(Continued)

*Primary Examiner* — Lixi C Simpson
(74) *Attorney, Agent, or Firm* — PV IP PC; Wei Te Chung

(57) ABSTRACT

A display panel driving method and a display device are provided. The display panel driving method includes: receiving a refresh rate switching instruction, where the refresh rate switching instruction is configured to control a display panel to switch from a first refresh rate to a second refresh rate; causing an input first video signal with a first image resolution and a first frame rate to be generated into a second video signal with a second image resolution and a second frame rate according to the refresh rate switching instruction; and outputting a scan driving signal correspond-
(Continued)

ing to the second refresh rate and the second video signal to a plurality of pixels of the display panel.

18 Claims, 6 Drawing Sheets

(56) References Cited

OTHER PUBLICATIONS

English translation of CN-104681000-B (Year: 2018).*
German Office Action issued in corresponding German Patent Application No. 102024203332.4 dated Jul. 2, 2024, pp. 1-7.

* cited by examiner

DISPLAY PANEL DRIVING METHOD AND DISPLAY DEVICE

CROSS REFERENCE TO RELATED APPLICATIONS

This application claims priority to Chinese Patent Application No. 202311692040.2, filed on Dec. 8, 2023, and entitled "DISPLAY PANEL DRIVING METHOD AND DISPLAY DEVICE". The entire disclosures of the above application are incorporated herein by reference.

TECHNICAL FIELD

The present disclosure relates to the field of display technologies, and in particular to a display panel driving method and a display device.

BACKGROUND

Most of existing display panels use a 1G1D (one gate line one data line) drive architecture, which has 12 source drive chips and is relatively expensive. In order to reduce costs, an UHD (ultra high definition) tri-gate drive architecture is now adopted. Under this drive architecture, a number of source drive chips in a display panel is reduced to four, significantly reducing costs. However, the existing frequency-doubling drive technology (from 60 Hz to 120 Hz) cannot be applied to the tri-gate drive architecture. This results in the tri-gate drive architecture only working in 60 Hz mode and unable to achieve 120 Hz high refresh rate display.

Accordingly, the existing frequency-doubling drive technology cannot be applied to display panels with different drive architectures.

Therefore, it is necessary to propose a new technical solution to solve the above technical problems.

SUMMARY

The present disclosure provides a display panel driving method and a display device, which can implement frequency-doubling driving in display panels with different drive architectures.

The present disclosure provides a display panel driving method. The display panel driving method includes: receiving a refresh rate switching instruction, where the refresh rate switching instruction is configured to control a display panel to switch from a first refresh rate to a second refresh rate; causing an input first video signal with a first image resolution and a first frame rate to be generated into a second video signal with a second image resolution and a second frame rate according to the refresh rate switching instruction; and outputting a scan driving signal corresponding to the second refresh rate and the second video signal to a plurality of pixels of the display panel.

In the above display panel driving method, the step of causing the input first video signal with the first image resolution and the first frame rate to be generated into the second video signal with the second image resolution and the second frame rate according to the refresh rate switching instruction includes: causing the first video signal to be generated into a third video signal with the first image resolution and the second frame rate according to the refresh rate switching instruction; and causing the third video signal to be generated into the second video signal.

In the above display panel driving method, the second refresh rate is twice the first refresh rate, and the second frame rate is twice the first frame rate. The step of causing the first video signal to be generated into the third video signal with the first image resolution and the second frame rate according to the refresh rate switching instruction includes: causing one first video signal to be generated into two first video signals according to the refresh rate switching instruction; combining the two first video signals into the third video signal, where a (2L−1)th frame image in the third video signal is the same as a 2L-th frame image, and is the same as an L-th frame image in the first video signal, and L is a positive integer. The step of causing the third video signal to be generated into the second video signal includes: acquiring image data of odd-numbered columns of a M-th frame image in the third video signal and image data of even-numbered columns of a (M+1)th frame image in the third video signal, where M is a positive integer; and generating the second video signal according to the image data of the odd-numbered columns of the M-th frame image and the image data of the even-numbered columns of the (M+1)th frame image, where image data of a M-th frame image in the second video signal includes the image data of the odd-numbered columns of the M-th frame image in the third video signal, and image data of a (M+1)th frame image in the second video signal includes the image data of the even-numbered columns of the (M+1)th frame image in the third video signal.

In the above display panel driving method, the step of outputting the scan driving signal corresponding to the second refresh rate and the second video signal to the plurality of pixels of the display panel includes: outputting image data of P columns of a N-th frame image in the second video signal to pixels of P odd-numbered columns of the display panel within a driving period of the N-th frame image according to the second refresh rate, and outputting a common voltage to pixels of P even-numbered columns of the display panel within the driving period of the N-th frame image; and outputting image data of P columns of a (N+1)th frame image in the second video signal to the pixels of the P even-numbered columns of the display panel within a driving period of the (N+1)th frame image, and outputting the common voltage to the pixels of the P odd-numbered columns of the display panel within the driving period of the (N+1)th frame image; where N and P are both positive integers.

In the above display panel driving method, the step of outputting the scan driving signal corresponding to the second refresh rate and the second video signal to the plurality of pixels of the display panel includes: outputting image data of P columns of a N-th frame image in the second video signal to pixels of P odd-numbered columns of the display panel within a driving period of the N-th frame image according to the second refresh rate, and disconnecting a current path between a source drive circuit of the display panel and pixels of P even-numbered columns of the display panel within the driving period of the N-th frame image; and outputting image data of P columns of a (N+1)th frame image in the second video signal to the pixels of the P even-numbered columns of the display panel within a driving period of the (N+1)th frame image, and disconnecting a current path between the source drive circuit and the pixels of the P odd-numbered columns of the display panel within the driving period of the (N+1)th frame image; where N and P are both positive integers.

In the above display panel driving method, the step of causing the input first video signal with the first image resolution and the first frame rate to be generated into the second video signal with the second image resolution and the second frame rate according to the refresh rate switching instruction includes: scaling the first video signal to a fourth video signal with the second image resolution and the first frame rate according to the refresh rate switching instruction; generating two fourth video signals from one fourth video signal; combining the two fourth video signals into the second video signal, where a (2L−1)th frame image in the second video signal is the same as a 2L-th frame image, and is the same as an L-th frame image in the fourth video signal, and L is a positive integer.

In the above display panel driving method, the step of outputting the scan driving signal corresponding to the second refresh rate and the second video signal to the plurality of pixels of the display panel includes: replicating image data of P columns of a Q-th frame image in the second video signal into image data of 2P columns; and outputting the image data of the 2P columns to pixels of the 2P columns of the display panel within a driving period of the Q-th frame image, where image data of the same two columns in the image data of the 2P columns obtained after replicating is output to pixels of two adjacent columns of the display panel, and P and Q are both positive integers.

In the above display panel driving method, the display panel further includes a plurality of scan lines and a plurality of data lines, one of the scan lines is electrically connected to one row of pixels, and one of the data lines is electrically connected to one column of pixels.

In the above display panel driving method, the display panel further includes a gate drive circuit and a source drive circuit; a scan start signal, a reset signal, a clock signal are input into the gate drive circuit; and a high-level of one of the scan start signal and the reset signal is the same as a high-level of the clock signal.

In the above display panel driving method, according to a timing control signal corresponding to the second refresh rate, the scan driving signal corresponding to the second refresh rate is output to a plurality of rows of pixels of the display panel.

In the above display panel driving method, according to a timing control signal corresponding to the second refresh rate, the second video signal is output to a plurality of columns of pixels of the display panel.

In the above display panel driving method, a duty cycle of the scan driving signal corresponding to the second refresh rate is equal to a duty cycle of the scan driving signal corresponding to the first refresh rate; and/or a pulse amplitude of the scan driving signal corresponding to the second refresh rate is greater than a pulse amplitude of the scan driving signal corresponding to the first refresh rate.

In the above display panel driving method, in image data of odd-numbered frames, image data corresponding to pixels of odd-numbered columns of the display panel is retained, and image data corresponding to pixels of even-numbered columns of the display panel is removed; and in image data of even-numbered frames, the image data corresponding to the pixels of the even-numbered columns of the display panel is retained, and the image data corresponding to the pixels of the odd-numbered columns of the display panel is removed.

In the above display panel driving method, in image data of odd-numbered frames, a voltage of image data corresponding to pixels of even-numbered columns of the display panel is assigned as a voltage of a common electrode of the display panel; and in image data of the even-numbered frames, a voltage of image data corresponding to pixels of odd-numbered columns of the display panel is assigned as the voltage of the common electrode of the display panel.

The present disclosure also provides a display device. The display device includes a display panel and a control chip. The display panel includes a gate drive circuit, a source drive circuit, and a plurality of pixels, the control chip is electrically connected to the gate drive circuit and the source drive circuit of the display panel, the gate drive circuit and the source drive circuit are both electrically connected to a plurality of the pixels; the control chip is configured to receive a refresh rate switching instruction, is configured to cause an input first video signal with a first image resolution and a first frame rate to be generated into a second video signal with a second image resolution and a second frame rate according to the refresh rate switching instruction, and is configured to output a scan driving signal corresponding to the second refresh rate and the second video signal to the plurality of pixels of the display panel through the gate drive circuit and the source drive circuit; and the refresh rate switching instruction is configured to control the display panel to switch from a first refresh rate to a second refresh rate.

In the above display device, the second refresh rate is twice the first refresh rate, and the second frame rate is twice the first frame rate; the control chip is configured to cause one first video signal to be generated into two first video signals according to the refresh rate switching instruction, is configured to combine the two first video signals into the third video signal, is configured to acquire image data of odd-numbered columns of a M-th frame image in the third video signal and image data of even-numbered columns of a (M+1)th frame image in the third video signal, and is configured to generate the second video signal according to the image data of the odd-numbered columns of the M-th frame image and the image data of the even-numbered columns of the (M+1)th frame image; where a (2L−1)th frame image in the third video signal is the same as a 2L-th frame image, and is the same as an L-th frame image in the first video signal, and L and M are both positive integers; image data of a M-th frame image in the second video signal includes the image data of the odd-numbered columns of the M-th frame image in the third video signal, and image data of a (M+1)th frame image in the second video signal includes the image data of the even-numbered columns of the (M+1)th frame image in the third video signal.

In the above display device, the source drive circuit includes a data register and a line latch, the data register is electrically connected to the line latch, and the line latch is electrically connected to a plurality of columns of pixels of the display panel; the data register is configured to output image data of P columns of a N-th frame image in the second video signal to pixels of P odd-numbered columns of the display panel within a driving period of the N-th frame image according to the second refresh rate, is configured to output a common voltage to pixels of P even-numbered columns of the display panel within the driving period of the N-th frame image, is configured to output image data of P columns of a (N+1)th frame image in the second video signal to the pixels of the P even-numbered columns of the display panel within a driving period of the (N+1)th frame image, and is configured to output the common voltage to the pixels of the P odd-numbered columns of the display panel within the driving period of the (N+1)th frame image; or the data register or the line latch is configured to output the image data of P columns of the N-th frame image in the second video signal to the pixels of the P odd-numbered columns of the display panel within the driving period of the N-th frame image according to the second refresh rate, is configured to disconnect a current path between the source drive circuit of the display panel and the pixels of the P even-numbered columns of the display panel within the driving period of the N-th frame image, is configured to output the image data of P columns of the (N+1)th frame image in the second video signal to the pixels of the P even-numbered columns of the display panel within the driving period of the (N+1)th frame image, and is configured to disconnect a current path between the source drive circuit and the pixels of the P odd-numbered columns of the display panel within the driving period of the (N+1)th frame image; where N and P are both positive integers.

In the above display device, the source drive circuit includes an output controller, and the output controller is electrically connected to a plurality of columns of pixels; the output controller is configured to connect a current path between the source drive circuit and pixels of P odd-numbered columns of the display panel within a driving period of the N-th frame image, is configured to disconnect a current path between the source drive circuit and pixels of P even-numbered columns of the display panel, is configured to connect the current path between the source drive circuit and the pixels of the P even-numbered columns of the display panel within a driving period of the (N+1)th frame image, and is configured to disconnect the current path between the source drive circuit and the pixels of the P odd-numbered columns of the display panel.

In the above display device, the control chip is configured to scale the first video signal to a fourth video signal with the second image resolution and the first frame rate according to the refresh rate switching instruction, is configured to generate two fourth video signals from one fourth video signal, and is configured to combine the two fourth video signals into the second video signal; where a (2L−1)th frame image in the second video signal is the same as a 2L-th frame image, and is the same as an L-th frame image in the fourth video signal, and L is a positive integer.

In the above display device, the source drive circuit is configured to replicate image data of P columns of a Q-th frame image in the second video signal into image data of 2P columns, and is configured to output the image data of the 2P columns to pixels of the 2P columns of the display panel within a driving period of the Q-th frame image; where image data of the same two columns in the image data of the 2P columns obtained after replicating is output to pixels of two adjacent columns of the display panel, and P and Q are both positive integers.

In technical solutions of the present disclosure, an input video signal with a low frame rate is reconstructed according to the refresh rate switching instruction, and a video signal with a high frame rate matching a high refresh rate is generated. The gate drive circuit is controlled according to the high refresh rate to output the scan driving signal matching the high refresh rate, and the source drive circuit is controlled to output the reconstructed video signal to the display panel at the high refresh rate. In this way, no matter what drive architecture the display panel adopts, switching from a low refresh rate to a high refresh rate can be achieved without changing a hardware circuit. For example, a display panel with a DLG drive technology based on the 1G1D drive architecture can be switched from 60 Hz to 120 Hz, or a display panel with a tri-gate drive architecture can be switched from 60 Hz to 120 Hz without changing the wiring of the display panel. This technical solution overcomes the problem that panels with different driving methods are difficult to be compatible with the frequency-doubling driving, thereby achieving the effect of frequency-doubling display in display panels with different drive architectures, and improving compatibility and applicability of frequency-doubling display.

DETAILED DESCRIPTION OF ILLUSTRATED EMBODIMENTS

Technical solutions in embodiments of the present disclosure will be described below with reference to the accompanying drawings in the embodiments of the present disclosure. The technical solutions described below are only used to explain and illustrate the idea of the present disclosure and should not be regarded as limiting the protection scope of the present disclosure.

Furthermore, terms “first”, “second” and similar words do not indicate any order, quantity, or importance, but are only used to distinguish different technical features. A term “plurality” and similar words mean two or more than two, unless expressly limited otherwise.

Currently, display panels using dual line gate (DLG) technology meet the demand for high refresh rates. The display panel with the DLG technology can achieve high refresh rate display such as 120 Hz based on a conventional one-gate-one-source (1G1D) architecture.

Figure 1:
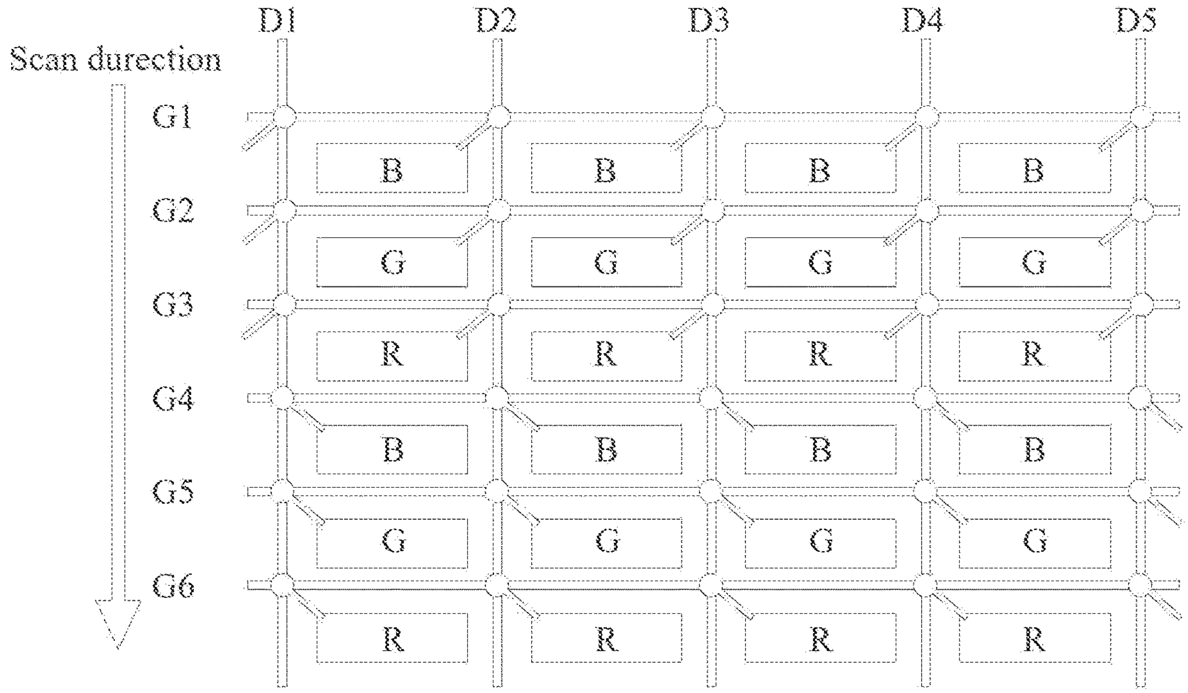
FIG. 1 is a schematic diagram of a display panel with a tri-gate drive architecture in a related art.

In ultra high definition (UHD) display panels, the lowest-cost drive architecture is a tri-gate drive architecture, as shown in FIG. 1. Compared with the 1G1D drive architecture that requires 12 source drive chips, the tri-gate drive architecture only requires 4 source drive chips. Therefore, the tri-gate drive architecture is expected to replace the DLG drive technology based on the 1G1D drive architecture and become the mainstream drive architecture for the ultra-high-definition display panels.

However, the traditional tri-gate drive architecture has a shortcoming: pixels in adjacent rows are pixels of different colors. In the display panel with the tri-gate drive architecture, a direct application of the DLG drive technology will cause serious display problems. In other words, the DLG technology is not suitable for the display panels with the tri-gate drive architecture. Currently, there is no solution in the industry that can switch between 60 Hz refresh rate and 120 Hz refresh rate in the display device with the tri-gate drive architecture.

In order to reduce costs while taking into account high refresh rate display, there is an urgent need to provide a technical solution to achieve switching between the 60 Hz refresh rate (regular refresh rate) and the 120 Hz high refresh rate in the display device with the tri-gate drive architecture. This is an important technical problem faced by current display technology.

Figure 2:
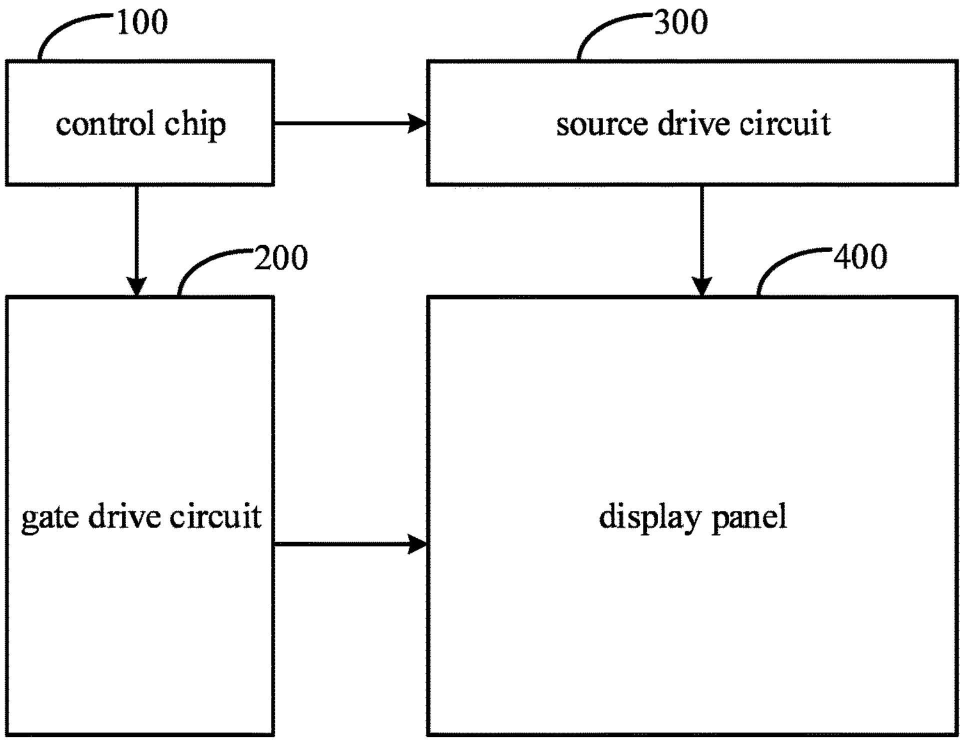
FIG. 2 is a schematic diagram of a display device of the present disclosure.

In view of this, a first embodiment of the present disclosure provides a display panel driving method and a display device. The display panel driving method runs in the display device provided by the present disclosure. As shown in FIG. 2, the display device includes a display panel 400 and a control chip. The display panel includes a gate drive circuit, a source drive circuit, and a plurality of pixels. The control chip is electrically connected to the gate drive circuit and the source drive circuit of the display panel. The gate drive circuit and the source drive circuit are both electrically connected to a plurality of the pixels.

The display panel 400 may be, for example, one of LCD, OLED, Mini-LED, Micro-LED, etc. A gate drive circuit 200 may be integrated into the display panel 400. A column resolution of the display panel 400 is 2P. That is, the display panel 400 includes 2P columns of pixels, and P is a positive integer.

The display panel 400 includes the plurality of pixels (multiple rows of pixels and multiple columns of pixels), plurality of scan lines, and plurality of data lines. One of the scan lines is electrically connected to a row of pixels. One of the data lines is electrically connected a column of pixels. A scan start signal (STV), a reset signal (Reset), and clock signals (CK1-CK12) are input to the gate drive circuit 200 and are configured to control the gate drive circuit 200 to scan multiple rows of pixels.

The display panel driving method of this embodiment includes the following steps:

The control chip receives a refresh rate switching instruction. The refresh rate switching instruction is configured to control the display panel 400 to switch from a first refresh rate to a second refresh rate. The refresh rate switching instruction may be generated based on a user's actions of operating a hardware button on an electronic device, may be generated based on the user's actions of operating a software button on a display interface, or may be generated based on voice instructions, gesture instructions, etc. issued by the user.

The control chip causes an input first video signal with a first image resolution and a first frame rate to be generated into a second video signal with a second image resolution and a second frame rate according to the refresh rate switching instruction.

The control chip outputs a scan driving signal corresponding to the second refresh rate and the second video signal to the plurality of pixels of the display panel through the gate drive circuit and the source drive circuit.

Specifically, the gate drive circuit 200 outputs the scan driving signal corresponding to the second refresh rate to a plurality of rows of pixels of the display panel 400 according to a timing control signal corresponding to the second refresh rate. The source drive circuit 300 outputs the second video signal to a plurality of columns of pixels of the display panel 400 according to a timing control signal corresponding to the second refresh rate.

The gate drive circuit 200 outputs the scan driving signal according to the refresh rate switching instruction. The scan driving signal is a progressive scanning signal. For example, when the refresh rate switching instruction is configured to switch the refresh rate of the display panel 400 from the second refresh rate to the first refresh rate, the gate drive circuit 200 outputs a first scan driving signal corresponding to the first refresh rate according to the refresh rate switching instruction. When the refresh rate switching instruction is configured to switch the refresh rate of the display panel 400 from the first refresh rate to the second refresh rate, the gate drive circuit 200 controls the gate drive circuit 200 of the display panel 400 to output a second scan driving signal corresponding to the second refresh rate according to the refresh rate switching instruction.

The refresh rate switching instruction is a high-level signal indicating that the user needs to switch the refresh rate of the display panel 400 from the first refresh rate to the second refresh rate. The refresh rate switching instruction is a low-level signal indicating that the user needs to switch the refresh rate of the display panel 400 from the second refresh rate to the first refresh rate, and vice versa.

The second refresh rate is twice, three, or four times the first refresh rate, and so on.

Figure 3:
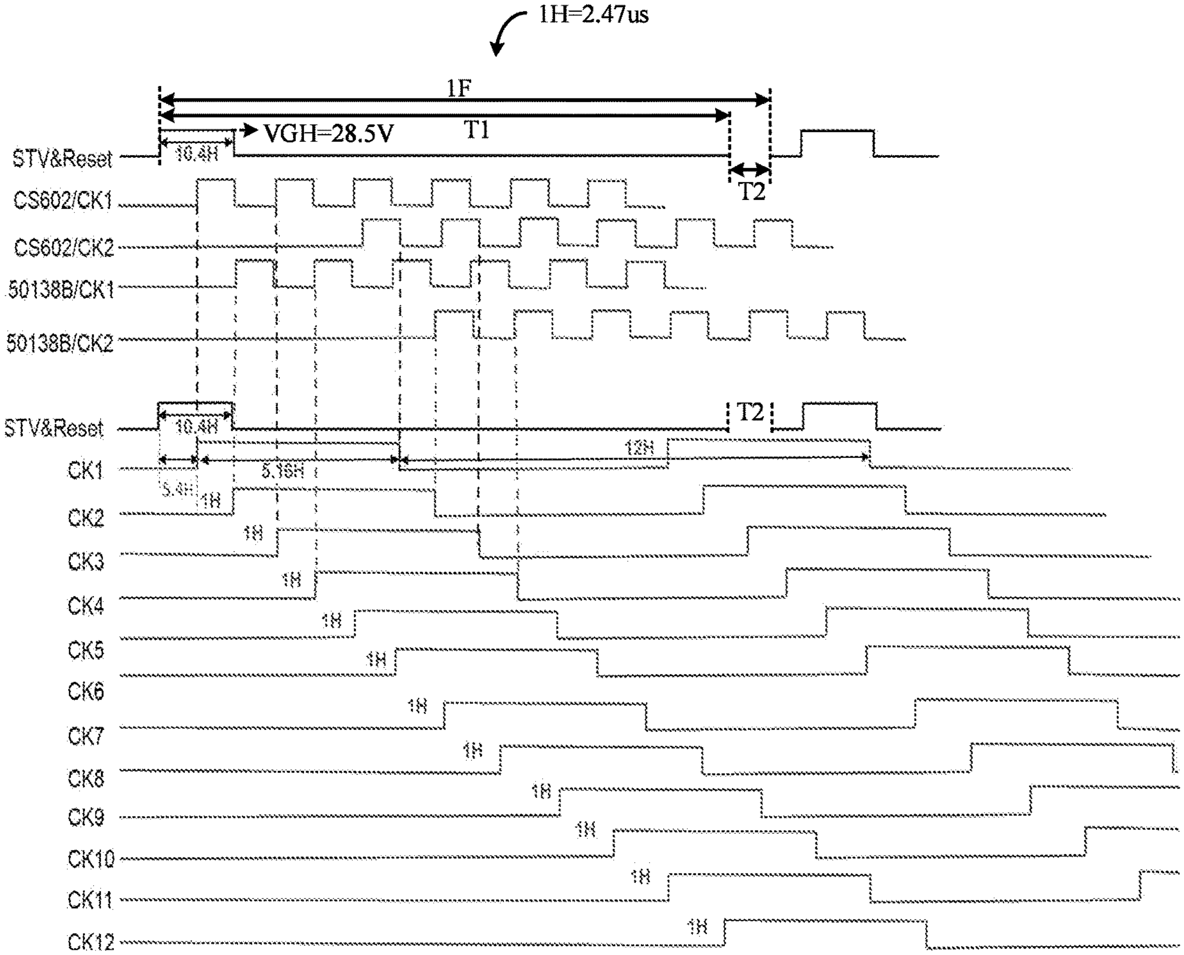
FIG. 3 is a schematic diagram of a scan drive timing sequence of a display device under a normal refresh rate in the related art.

As shown in FIG. 3, the display device also includes a power management chip. A model of the power management chip is CS602, which integrates three functions: power management, gamma voltage generation, and level conversion. A model number of a level shifter or a level shift IC of the display device is 50138B. In order to reduce the temperature and power consumption at the 120 Hz refresh rate, the display device adopts a technical solution of CS602 power management chip paired with 50138B level shift IC.

The power management chip provides the required power supply voltage for the gate drive circuit 200, the source drive circuit 300, the control chip 100, and the display panel 400. The level shift IC provides the corresponding high-level (VGH) and low-level (VGL) for the gate drive circuit 200.

CS602/CK1 and CS602/CK2 are the two clock signals in the power management chip. 50138B/CK1 and 50138B/CK2 are the two clock signals in the level shift IC.

A time corresponding to a first rising edge of the clock signal CS602/CK1 is the same as a time corresponding to a first rising edge of CK1. A time corresponding to a second rising edge of the clock signal CS602/CK1 is the same as a time corresponding to a first rising edge of CK3. A time corresponding to a first falling edge of the clock signal CS602/CK2 is the same as a time corresponding to a first falling edge of CK1. A time corresponding to a second falling edge of the clock signal CS602/CK2 is the same as a time corresponding to a first falling edge of CK3.

A time corresponding to the first rising edge of the clock signal 50138B/CK1 is the same as a time corresponding to a first rising edge of CK2. A time corresponding to a second rising edge of the clock signal 50138B/CK1 is the same as a time corresponding to a first rising edge of CK4. A time corresponding to a first rising edge of the clock signal 50138B/CK2 is the same as a time corresponding to a first falling edge of CK2. A time corresponding to a second rising edge of the clock signal 50138B/CK2 is the same as a time corresponding to a first falling edge of CK4.

An interval between a rising edge of a first pulse of one of the scan start signal (STV) and the reset signal (Reset) and a rising edge of a first pulse of CK1 is 5.4H. A period of each clock signal (CK1-CK12) is 12H. A pulse duration is 5.16H. A duty cycle of each clock signal is 43%. An interval between rising edges of two adjacent clock signals in CK1-CK12 is 1H.

The pulse durations of the scan start signal (STV) and the reset signal (Reset) are both 10.4H, and H is a unit time. As shown in FIG. 3, in the 60 Hz refresh rate mode, 1H=2.47 us.

The high-level (VGH) of one of the scan start signal (STV) and the reset signal (Reset) is the same as the high-level of each of the clock signals. Therefore, by controlling the high-level of one of the scan start signal (STV) and the reset signal (Reset), the high-level of each clock signal can be controlled. In the 60 Hz refresh rate mode, the high-level VGH is set to 28.5V to save power consumption while meeting charging conditions corresponding to the 60 Hz refresh rate.

Figure 6:
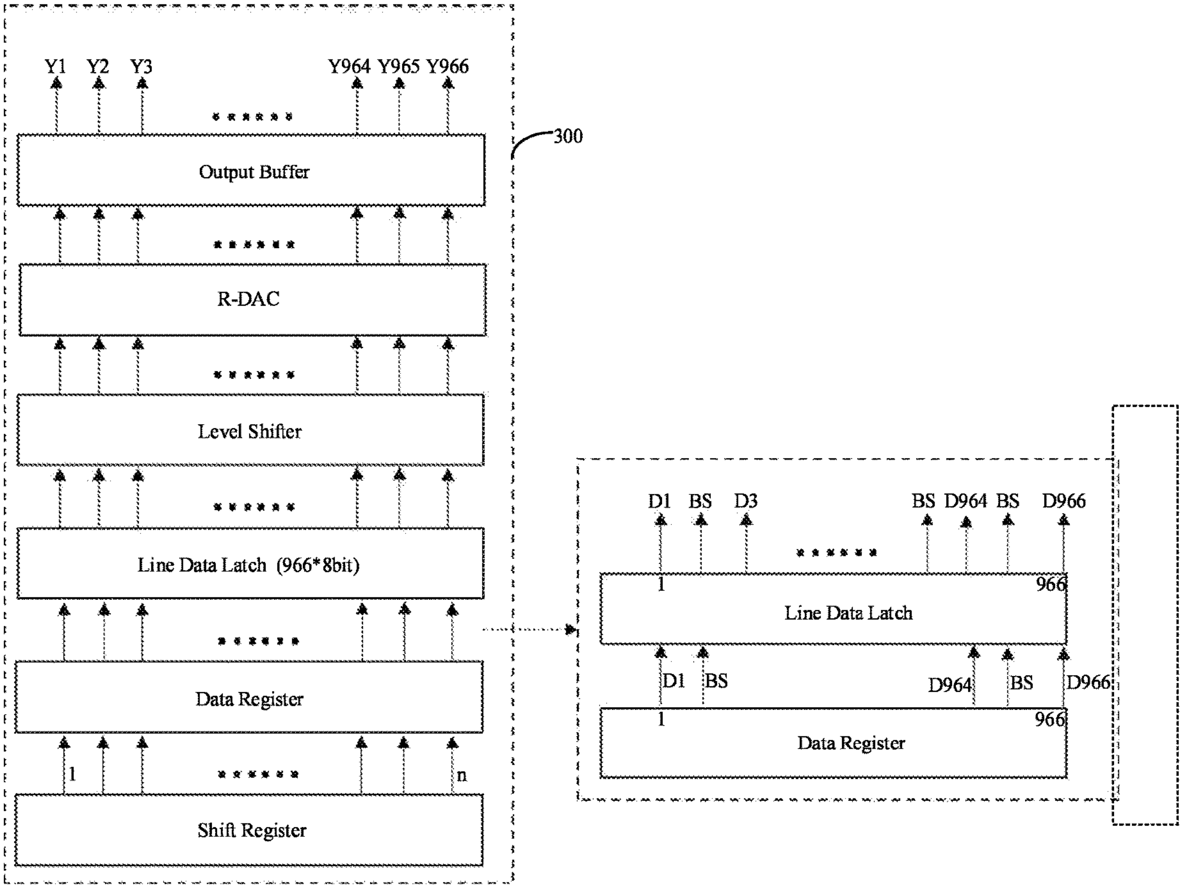
FIG. 6 is a block diagram of a source drive circuit of FIG. 5.

As shown in FIG. 6, the source drive circuit 300 may include a shift register, a data register, a line latch, a level shifter, a digital-to-analog converter (R-DAC), and an output buffer which are electrically connected. The above devices all include n transmission channels for outputting n data signals, and the source drive circuit 300 has n output pins, and n can be equal to 966, that is, the source drive circuit 300 can output 966 data signals Y1-Y966.

Figure 4:
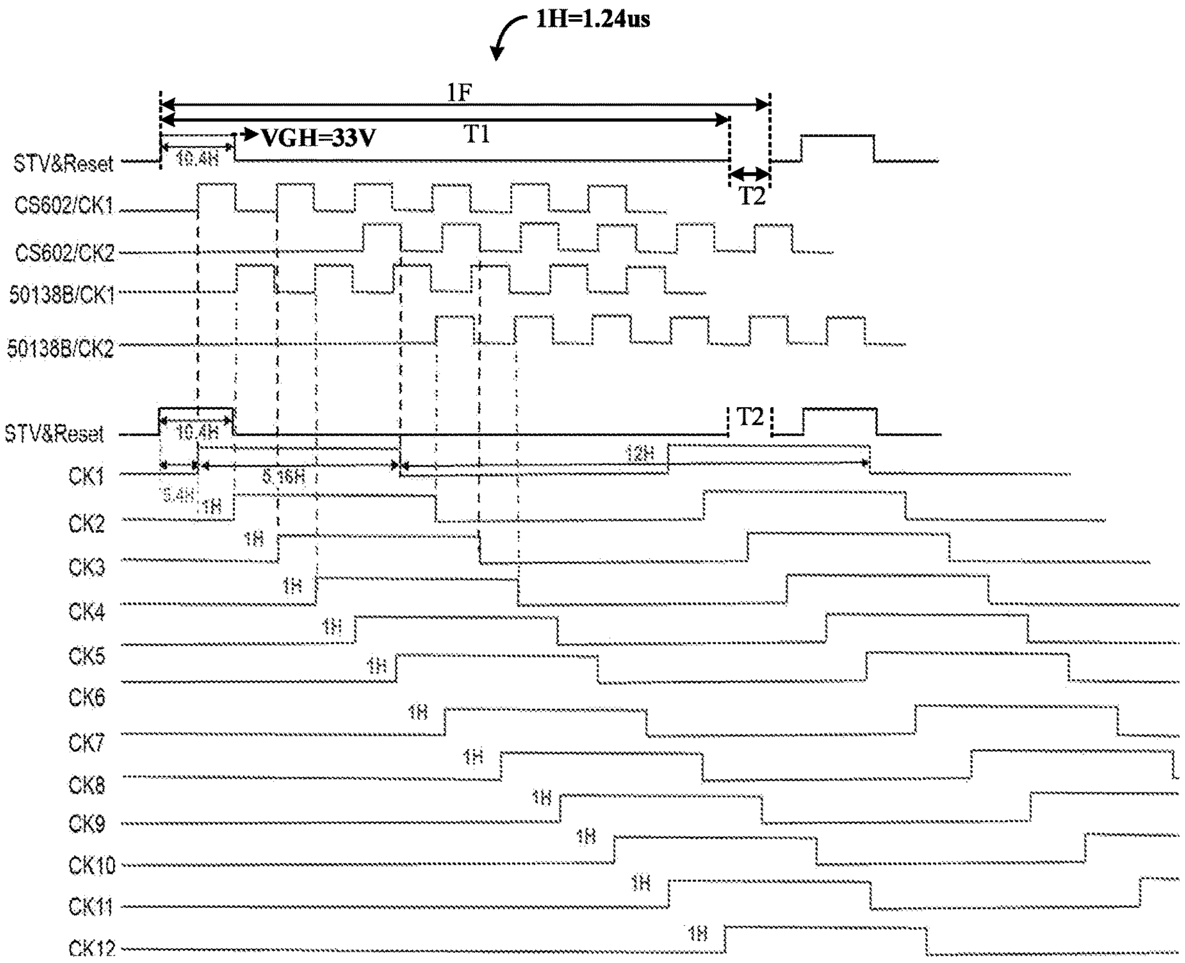
FIG. 4 is a schematic diagram of a scan drive timing sequence of a display device under a frequency-doubling refresh rate of the present disclosure.

As shown in FIG. 4, the refresh rate is increased from 60 Hz to 120 Hz. In the frequency-doubling mode of 120 Hz refresh rate, 1H=1.24 us. The period of each clock signal remains the same, that is, 12H. The duty cycle of each clock signal remains the same, that is, 43%. In order to maximize a charging rate of sub-pixels, high-level VGH is further raised to 33V.

As shown in FIG. 3 and FIG. 4, a duty cycle of the scan driving signal corresponding to the second refresh rate is equal to a duty cycle of the scan driving signal corresponding to the first refresh rate. That is, the duty cycle of the scan driving signal of the gate drive circuit 200 of the display panel 400 in the first refresh rate mode is equal to the duty cycle of the scan driving signal of the gate drive circuit 200 of the display panel 400 in the second refresh rate mode (an actual difference does not exceed 5%).

A pulse amplitude of the scan driving signal corresponding to the second refresh rate is greater than a pulse amplitude of the scan driving signal corresponding to the first refresh rate.

The pulse amplitude of the scan driving signal corresponding to the second refresh rate ranges from 29V to 39V. For example, the pulse amplitude of the driving signal is 29V, 29.5V, 30V, 30.5V, 31V, 31.5V, 32V, 32.5V, 33V, 33.5V, 34V, 34.5V, 35V, 35.5V, 36V, 36.5V, 37V, 37.5V, 38V, 38.5V, 39V.

A high-level duration of the scan driving signal of the gate drive circuit 200 of the display panel 400 in the first refresh rate mode is twice a high-level duration of the scan driving signal of the gate drive circuit 200 of the display panel 400 is in the second refresh rate mode.

The step of causing the input first video signal with the first image resolution and the first frame rate to be generated into the second video signal with the second image resolution and the second frame rate according to the refresh rate switching instruction includes the following:

The control chip causes the first video signal to be generated into a third video signal with the first image resolution and the second frame rate according to the refresh rate switching instruction.

The control chip causes the third video signal to be generated into the second video signal.

The second refresh rate is twice the first refresh rate, and the second frame rate is twice the first frame rate.

The step of causing the first video signal to be generated into the third video signal with the first image resolution and the second frame rate according to the refresh rate switching instruction includes the following:

The control chip causes one first video signal to be generated into two first video signals according to the refresh rate switching instruction.

The control chip combines the two first video signals into the third video signal. A (2L−1)th frame image in the third video signal is the same as a 2L-th frame image, and is the same as an L-th frame image in the first video signal, and L is a positive integer.

The step of causing the third video signal to be generated into the second video signal includes the following:

The control chip acquires image data of odd-numbered columns of a M-th frame image in the third video signal and image data of even-numbered columns of a (M+1)th frame image in the third video signal, where M is a positive integer.

The control chip generates the second video signal according to the image data of the odd-numbered columns of the M-th frame image and the image data of the even-numbered columns of the (M+1)th frame image, where image data of a M-th frame image in the second video signal includes the image data of the odd-numbered columns of the M-th frame image in the third video signal, and image data of a (M+1)th frame image in the second video signal includes the image data of the even-numbered columns of the (M+1)th frame image in the third video signal.

The source drive circuit includes a data register, and the data register is electrically connected to multiple columns of pixels.

The step of outputting the scan driving signal corresponding to the second refresh rate and the second video signal to the plurality of pixels of the display panel includes the following:

The data register outputs image data of P columns of a N-th frame image in the second video signal to pixels of P odd-numbered columns of the display panel 400 within a driving period of the N-th frame image according to the second refresh rate.

The data register outputs image data of P columns of a (N+1)th frame image in the second video signal to the pixels of the P even-numbered columns of the display panel 400 within a driving period of the (N+1)th frame image, where N and P are both positive integers.

The step of outputting the scan driving signal corresponding to the second refresh rate and the second video signal to the plurality of pixels of the display panel includes the following:

The data register outputs a common voltage to pixels of P even-numbered columns of the display panel 400 within the driving period of the N-th frame image.

The data register outputs the common voltage to the pixels of the P odd-numbered columns of the display panel 400 within the driving period of the (N+1)th frame image.

Specifically, the control chip 100 adjusts the first video signal of the first frame rate to the second video signal of the second frame rate.

In image data of odd-numbered frames, the control chip retains image data corresponding to pixels of odd-numbered columns of the display panel 400, and removes image data corresponding to pixels of even-numbered columns of the display panel 400. In image data of even-numbered frames, the image data corresponding to the pixels of the even-numbered columns of the display panel 400 is retained, and the image data corresponding to the pixels of the odd-numbered columns of the display panel 400 is removed.

In image data of odd-numbered frames, the data register assigns a voltage of image data corresponding to pixels of even-numbered columns of the display panel 400 as a voltage of a common electrode of the display panel 400 (black insertion process). In image data of the even-numbered frames, a voltage of image data corresponding to pixels of odd-numbered columns of the display panel 400 is assigned as the voltage of the common electrode of the display panel 400.

That is, for odd-numbered frame images, the data register sets the voltage of the image data output by even-numbered channels to a black insertion voltage (BS), i.e., the voltage of the common electrode. For even-numbered frame images, the data register sets the voltage of the image data output by odd-numbered channels to the black insertion voltage.

Figure 5:
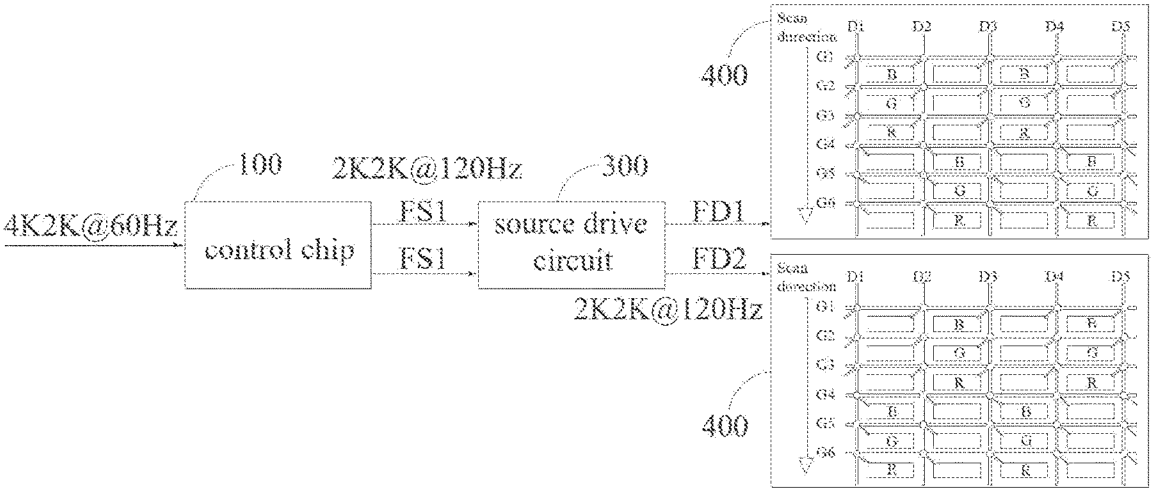
FIG. 5 is a schematic diagram of a first working principle of a display device of the present disclosure.

Specifically, as shown in FIG. 5, an UHD (4K2K) 60 Hz display device displays in 60 Hz (first refresh rate) mode by default. When receiving a display request (refresh rate switching instruction) in the frequency-doubling 120 Hz (second refresh rate) mode, a SoC (control chip 100) in the display device issues an instruction to the gate drive circuit 200. The gate drive circuit 200 outputs a 4K2K 120 Hz (second refresh rate) scan driving signal to the display panel 400. The SoC (control chip 100) causes an input first video signal of 4K2K (first image resolution) and 60 Hz (first frame rate) to be generated in to a third video signal of 4K2K (first image resolution) and 120 Hz (second frame rate), and then performs a data column acquisition processing on the third video signal. For the odd-numbered frames in the third video signal, the image data of even-numbered columns is acquired. For the even-numbered frames in the third video signal, the image data of odd-numbered columns is acquired. Alternatively, for the odd-numbered frames in the third video signal, the image data of the odd-numbered columns is acquired. For the even-numbered frames in the third video signal, the image data of even-numbered columns is acquired. Thus, the second video signal of 2K2K (second image resolution) and 120 Hz (second frame rate) is obtained (the signals of odd-numbered frames and even-numbered frames after the column acquisition processing are different). The second video signal is output to the source drive circuit 300. The data register performs a black insertion processing on the display panel 400 according to the second video signal. The black insertion method is as follows. A voltage of the pixel column corresponding to the data acquired from one frame of the second video signal in the display panel 400 is set to a common voltage (a voltage value is equal to a voltage value of the common electrode input to a counter substrate). That is, a voltage difference between the pixel column in which the data set to the common voltage is input in a thin film transistor array substrate and the counter substrate is zero. In the odd-numbered frame image of the second video signal, data of the even-numbered columns is performed with a supplementarily black insertion processing. In the even-numbered frames of the second video signal, data of the odd-numbered columns is performed with the supplementarily black insertion processing.

Finally, the display panel 400 displays images of 2K2K (second image resolution) and 120 Hz (second frame rate), thereby achieving a goal of frequency-doubling 120 Hz (second refresh rate).

Taking the display panel 400 with the tri-gate drive architecture as an example, for an image FD1 of odd-numbered frames, a first pixel, a second pixel, and a third pixel in a first column all display color images. A fourth pixel, a fifth pixel, and a sixth pixel in the first column all display black. A first pixel, a second pixel, and a third pixel in a second column all display black. A fourth pixel, a fifth pixel, and a sixth pixel in the second column all display color images. A first pixel, a second pixel, and a third pixel in a third column all display color images. A fourth pixel, a fifth pixel, and a sixth pixel in the third column all display black. A first pixel, a second pixel, and a third pixel in a fourth column all display black. A fourth pixel, a fifth pixel, and a sixth pixel in the fourth column all display color images. For an image FD2 of even-numbered frames, a first pixel, a second pixel, and a third pixel in a first column all display black. A fourth pixel, a fifth pixel, and a sixth pixel in the first column all display color images. A first pixel, a second pixel, and a third pixel in a second column all display color images. A fourth pixel, a fifth pixel, and a sixth pixel in the second column all display black. A first pixel, a second pixel, and a third pixel in a third column all display black. A fourth pixel, a fifth pixel, and a sixth pixel in the third column all display color images. A first pixel, a second pixel, and a third pixel in a fourth column all display color images. A fourth pixel, a fifth pixel, and a sixth pixel in the fourth column all display black.

FS1 refers to the image data of odd-numbered frames. FS2 refers to the image data of even-numbered frames. FD1 refers to the image data of odd-numbered frames. FD2 refers to the image data of even-numbered frames. FS1, FS2, FD1, and FD2 are all images of the second video signal.

A driving period (1F) of one frame of image includes an effective display period (T1) and a blank display period (T2).

A second embodiment of the present disclosure is similar to the above-mentioned first embodiment, with the following differences.

The step of outputting the scan driving signal corresponding to the second refresh rate and the second video signal to the plurality of pixels of the display panel also includes the following:

The data register of the source drive circuit 300 disconnects a current path between a source drive circuit 300 and pixels of P even-numbered columns of the display panel 400 within the driving period of the N-th frame image.

The data register disconnects a current path between the source drive circuit 300 and the pixels of the P odd-numbered columns of the display panel 400 within the driving period of the (N+1)th frame image.

Alternatively, before the data register outputs the image data of the N-th frame to the display panel 400, the line latch of the source drive circuit 300 disconnects a transmission channel of the pixels corresponding to the even-numbered columns between the data register and the display panel 400. Before the data register outputs the image data of the (N+1)th frame to the display panel 400, a transmission channel of the pixels corresponding to the odd-numbered columns between the data register and the display panel 40 is disconnected.

Alternatively, the source drive circuit 300 also includes an output controller. Multiple input terminals of the output controller are electrically connected to multiple output terminals of the output buffer of the source drive circuit 300. Multiple output terminals of the output controller are electrically connected to multiple columns of pixels. The output controller includes a plurality of transistors (for example, 966 transistors). All odd-numbered transistors in multiple transistors are turned on or off at the same time. All even-numbered transistors are turned on or off at the same time. However, the odd-numbered transistors are turned-on when the even-numbered transistors are turned-off, and the even-numbered transistors are turned-on when the odd-numbered transistors are turned-off. During the driving period of the N-th frame image, the output controller connects the current path between the source drive circuit 300 and the pixels of the P odd-numbered columns of the display panel 400, and disconnects the current path between the source drive circuit 300 and the pixels of the P even-numbered columns of the display panel 400. During the driving period of the (N+1)th frame image, the output controller connects the current path between the source drive circuit 300 and the pixels of the P even-numbered columns of the display panel 400, and disconnects the current path between the source drive circuit 300 and the pixels of P odd-numbered columns of the display panel 400.

Figure 7:
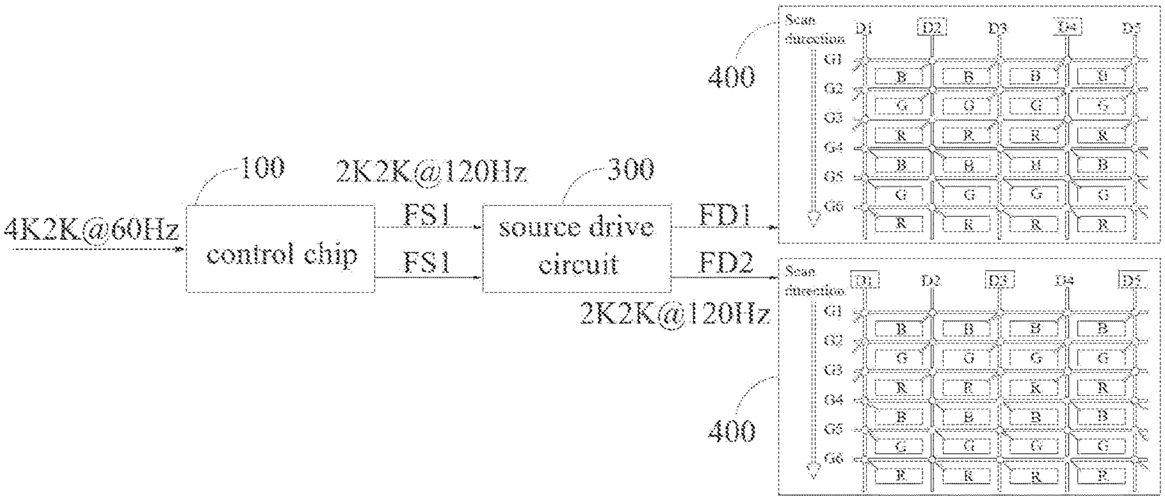
FIG. 7 is a schematic diagram of a second working principle of a display device of the present disclosure.
Figure 8:
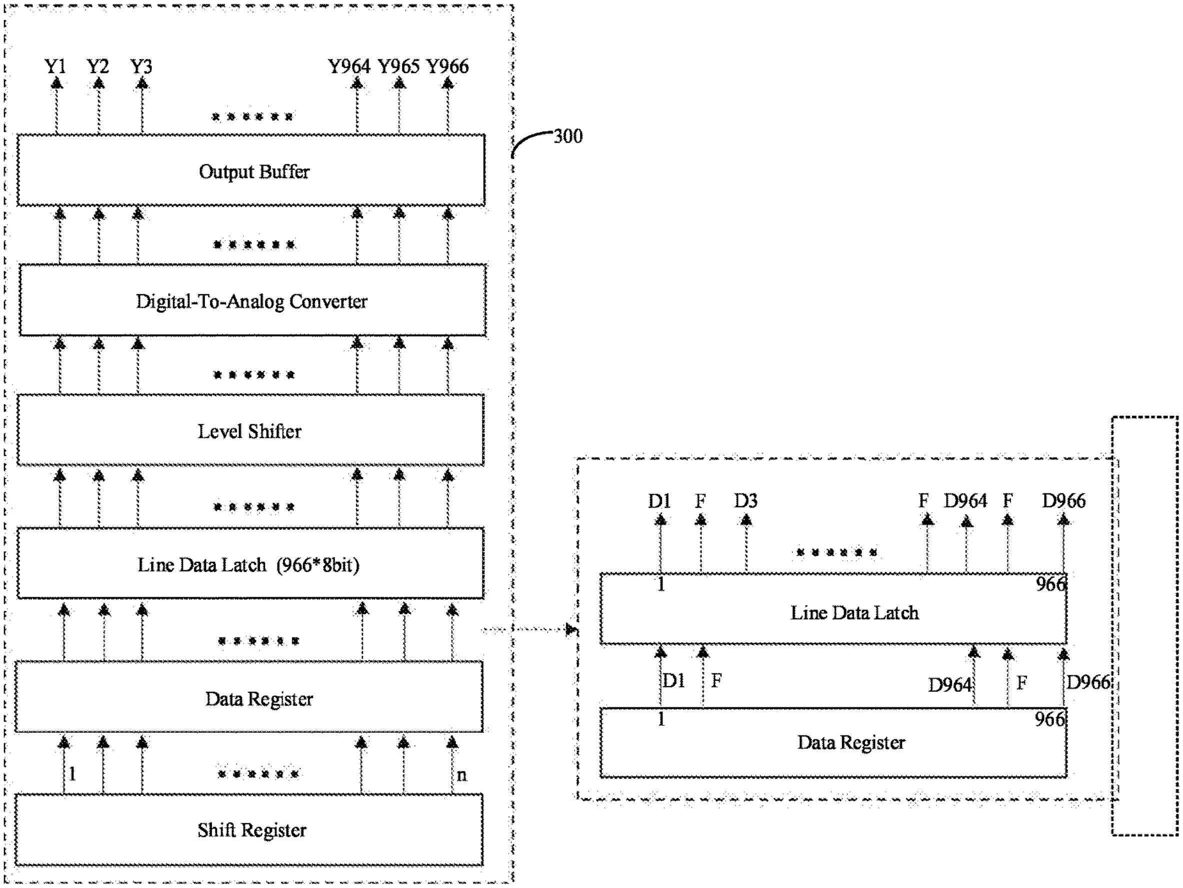
FIG. 8 is a block diagram of a source drive circuit of FIG. 7.

Specifically, as shown in FIG. 7 and FIG. 8, the UHD (4K2K) 60 Hz display device displays in the 60 Hz (first refresh rate) mode by default. When receiving a display request (refresh rate switching instruction) in the frequency-doubling 120 Hz (second refresh rate) mode, a SoC (control chip 100) in the display device issues an instruction to the gate drive circuit 200. The gate drive circuit 200 outputs a 4K2K 120 Hz (second refresh rate) scan driving signal to the display panel 400. The SoC (control chip 100) causes an input first video signal of 4K2K (first image resolution) and 60 Hz (first frame rate) to be generated (replicated) to a third video signal of 4K2K (first image resolution) and 120 Hz (second frame rate), and then performs a data column acquisition processing on the third video signal. For the odd-numbered frames in the third video signal, the image data of even-numbered columns is acquired. For the even-numbered frames in the third video signal, the image data of odd-numbered columns is acquired. Alternatively, for the odd-numbered frames in the third video signal, the image data of the odd-numbered columns is acquired. For the even-numbered frames in the third video signal, the image data of even-numbered columns is acquired. Thus, the second video signal of 2K2K (second image resolution) and 120 Hz (second frame rate) is obtained (the signals of odd-numbered frames and even-numbered frames after the column acquisition processing are different). The second video signal is output to the source drive circuit 300. The source drive circuit 300 performs signal disconnection process/signal floating process on the display panel 400 according to the second video signal. The signal disconnection process/signal floating process is to disconnect a current path between the pixel column in the display panel 400 corresponding to the data acquired in one frame of the second video signal and the source drive circuit 300. For example, for the N-th frame in the third video signal, the source drive circuit 300 disconnects/floats the current path between the pixel columns in the display panel 400 corresponding to the image data of the even-numbered columns in the N-th frame and the source drive circuit 300. For the N+1th frame in the third video signal, the source drive circuit 300 disconnects/floats the current path between the pixel columns in the display panel 400 corresponding to the image data of odd-numbered columns in the (N+1)th frame and the source drive circuit 300. Specifically, as shown in FIG. 8, the source drive circuit 300 disconnects even-numbered transmission channels (F) between the data register and the line latch during the transmission process of image data of odd-numbered frames, so that pixels electrically connected to even-numbered transmission channels cannot receive data signals. The source drive circuit 300 also disconnects odd-numbered transmission channels between the data register and line latch during the transmission process of image data of even-numbered frames, so that pixels electrically connected to odd-numbered transmission channels cannot receive data signals.

Finally, the display panel 400 displays images of 2K2K (second image resolution) and 120 Hz (second frame rate), thereby achieving a goal of frequency-doubling 120 Hz (second refresh rate).

Compared with the technical solution of the black insertion processing in the above-mentioned first embodiment, in this embodiment, the pixels electrically connected to the even-numbered transmission channels and the pixels electrically connected to the odd-numbered transmission channels do not display black, but display original colors with darker brightness.

A third embodiment of the present disclosure is similar to the above-mentioned first embodiment or second embodiment, with the following differences:

The step of causing the input first video signal with the first image resolution and the first frame rate to be generated into the second video signal with the second image resolution and the second frame rate according to the refresh rate switching instruction includes the following:

An image scaling module of the control chip is configured to scale the first video signal to a fourth video signal with the second image resolution and the first frame rate according to the refresh rate switching instruction.

The control chip generates two fourth video signals from one fourth video signal.

The control chip combines the two fourth video signals into the second video signal. A (2L−1)th frame image in the second video signal is the same as a 2L-th frame image, and is the same as an L-th frame image in the fourth video signal, and L is a positive integer.

The step of outputting the scan driving signal corresponding to the second refresh rate and the second video signal to the plurality of pixels of the display panel includes the following:

The source drive circuit replicates image data of P columns of a Q-th frame image in the second video signal into image data of 2P columns.

The source drive circuit outputs the image data of the 2P columns to pixels of the 2P columns of the display panel 400 within a driving period of the Q-th frame image, where image data of the same two columns in the image data of the 2P columns obtained after replicating is output to pixels of two adjacent columns of the display panel 400, and P and Q are both positive integers.

Specifically, the control chip 100 includes an image scaling module. The image scaling module is configured to adjust the first image resolution of the first video signal to the second image resolution to generate the fourth video signal, and is configured to adjust the first frame rate of the fourth video signal to the second frame rate to generate the second video signal.

Every two output channels of the data register of the source drive circuit 300 share the same column of data signals in one frame of image.

Figure 9:
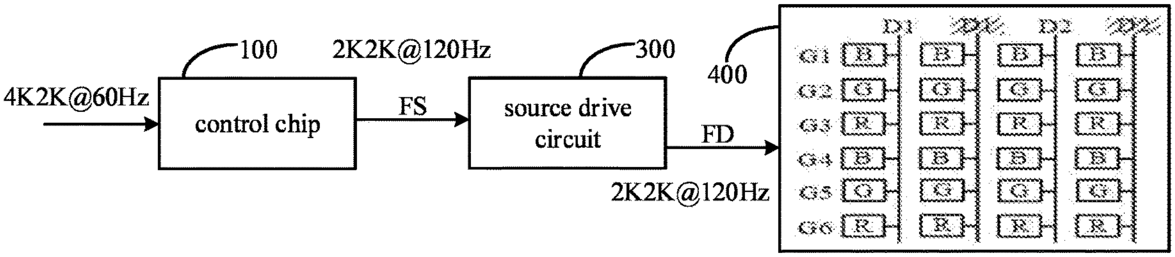
FIG. 9 is a schematic diagram of a third working principle of a display device of the present disclosure.
Figure 10:
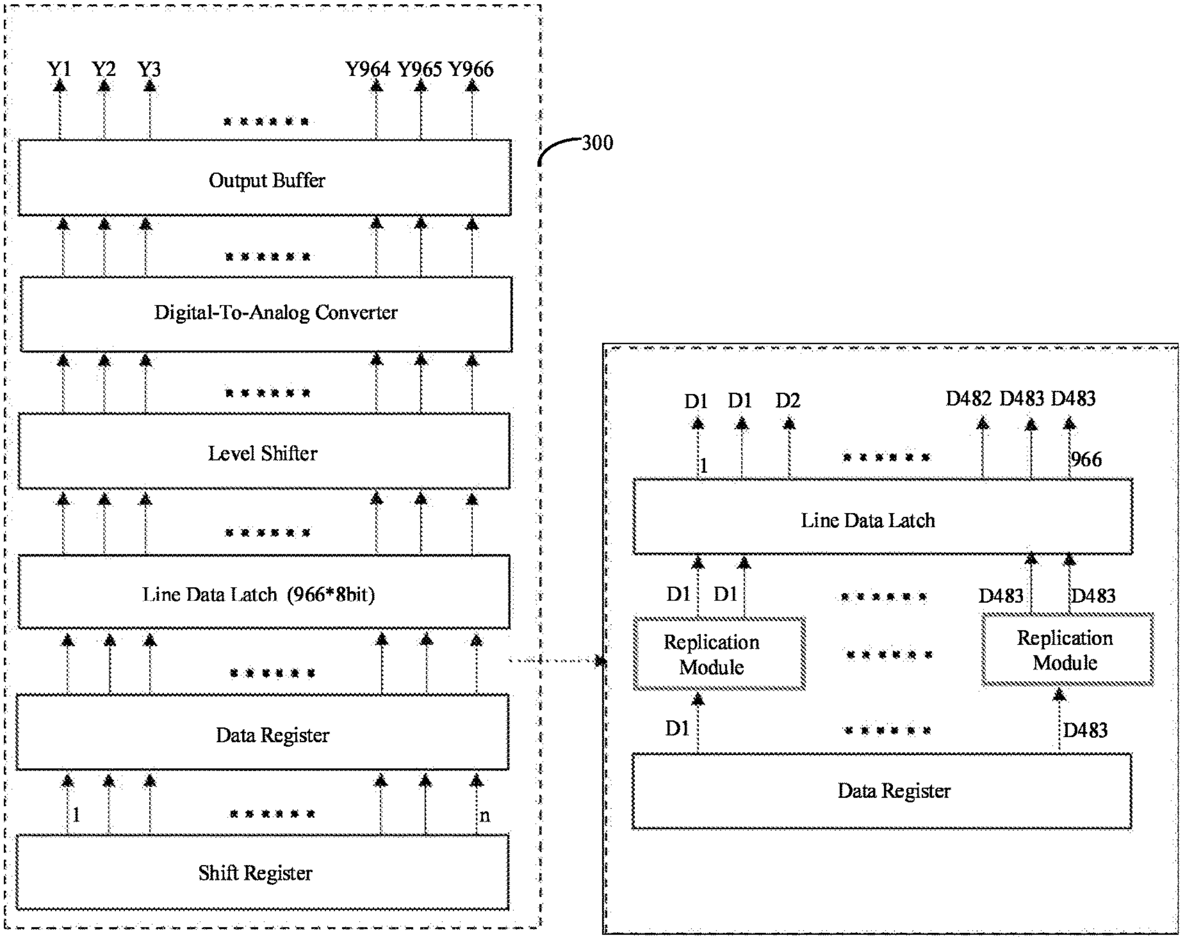
FIG. 10 is a block diagram of a source drive circuit of FIG. 9.

Specifically, the UHD (4K2K) 60 Hz display device displays in the 60 Hz (first refresh rate) mode by default. When receiving a display request (refresh rate switching instruction) in the frequency-doubling 120 Hz (second refresh rate) mode, a SoC (control chip 100) in the display device issues an instruction to the gate drive circuit 200. The gate drive circuit 200 outputs a 4K2K 120 Hz (second refresh rate) scan driving signal to the display panel 400. As shown in FIG. 9 and FIG. 10, the SoC (control chip 100) causes an input first video signal of 4K2K (first image resolution) and 60 Hz (first frame rate) to be generated into the fourth video signal of 2K2K (second image resolution) and 60 Hz (first frame rate) through the image scaling module (Scaler), and then replicates the fourth video signal. Two fourth video signals obtained after replicating are combined into 2K2K (second image resolution) and 120 Hz (second frame rate) second video signal. The signals of the odd-numbered frames and the even-numbered frames of the second video signal obtained after combining are the same (consistent). The second video signal is output to the source drive circuit 300. As shown in FIG. 10, the source drive circuit 300 replicates each column of image data in any frame of the second video signal to obtain twice the column image data. The execution method is as follows. For the display panel 400 of the 1G1D drive architecture and the tri-gate drive architecture, the source drive circuit 300 internally replicates data of adjacent parity channels (Channel). For the display panel 400 of the DLS drive architecture, the source drive circuit outputs one column of image data to two columns of pixels through a data line electrically connected to the two columns of pixels. As shown in FIG. 9 and FIG. 10, the image scaling module is configured to adjust the first video signal with 2*N columns of image data to the fourth video signal with N columns of image data, and to adjust the first frame rate of the fourth video signal to the second frame rate to obtain the second video signal. Each two output channels of the data register share the same column of image data. Finally, the display panel 400 displays an image of 2K2K (second image resolution) and 120 Hz (second frame rate), thereby achieving the high refresh rate target of frequency-doubling 120 Hz (second refresh rate).

The features in the above-mentioned first embodiment, second embodiment, and third embodiment can be combined with each other.

The working steps or functions of the control chip, the source drive circuit, and the gate drive circuit in the display device provided by the present disclosure correspond to the steps or functions in the above display panel driving method.

In the display panel driving method and the display device provided by the above embodiments of the present disclosure, the gate drive circuit 200 is controlled to adjust the timing of the scan driving signal according to the refresh rate switching instruction (frequency-doubling control instruction). Moreover, the control chip 100 and the source drive circuit 300 are controlled to adjust the image resolution and frame rate of the video signal according to the refresh rate switching instruction. Therefore, the display effect of doubling the refresh rate of the display panel 400 can be realized in a variety of different pixel driver architectures, and the limitations of different pixel driver architectures on the display panel 400 to achieve double refresh rate display effects are eliminated. In addition, since functions of a timing controller or the timing control chip 100 are integrated into the control chip 100, there is no need to use a separate timing controller or the timing control chip 100, which simplifies a driving system of the display device and reduces the cost.

In the technical solutions of the present disclosure, according to the refresh rate switching instruction, the control chip 100 reconstructs the input video signal with the low frame rate to generate the video signal with the high frame rate that matches the high refresh rate. Also, the timing control signal that controls the gate drive circuit 200 is output according to the high refresh rate, so that the gate drive circuit 200 outputs the scan driving signal that matches the high refresh rate. At the same time, the source drive circuit 300 is controlled to output the reconstructed video signal to the display panel 400 at the high refresh rate. In this way, no matter what kind of driver architecture the display panel 400 adopts, switching from the low refresh rate to the high refresh rate can be achieved without changing the hardware circuit. For example, the display panel 400 of the DLG drive technology based on the 1G1D drive architecture can be switched from 60 Hz to 120 Hz, or the display panel 400 of the tri-gate drive architecture can be switched from 60 Hz to 120 Hz without changing the wiring of the display panel 400. The technical solutions overcome the problem that displays with different drive methods are difficult to be compatible with the frequency-doubling driving, thereby realizing the frequency-doubling display in the display panel 400 with different drive architectures, and improving the compatibility and applicability of frequency-doubling displays.

The display panel driving method and the display device provided by the embodiments of the present disclosure have been described above. The above description is only used to help understand the technical solution and its core idea of the present disclosure. Modifications or substitutions of some of the technical features by those of ordinary skill in the art will not cause the essence of the corresponding technical solution to depart from the scope of protection of the claims of the present disclosure.

What is claimed is:

1. A display panel driving method, comprising:

receiving a refresh rate switching instruction, wherein the refresh rate switching instruction is configured to control a display panel to switch from a first refresh rate to a second refresh rate;

causing an input first video signal with a first image resolution and a first frame rate to be generated into a second video signal with a second image resolution and a second frame rate according to the refresh rate switching instruction; and outputting a scan driving signal corresponding to the second refresh rate and the second video signal to a plurality of pixels of the display panel;

wherein the step of causing the input first video signal with the first image resolution and the first frame rate to be generated into the second video signal with the second image resolution and the second frame rate according to the refresh rate switching instruction comprises:

causing the first video signal to be generated into a third video signal with the first image resolution and the second frame rate according to the refresh rate switching instruction; and causing the third video signal to be generated into the second video signal.

2. The display panel driving method of claim 1, wherein the second refresh rate is twice the first refresh rate, and the second frame rate is twice the first frame rate;

wherein the step of causing the first video signal to be generated into the third video signal with the first image resolution and the second frame rate according to the refresh rate switching instruction comprises:

causing one first video signal to be generated into two first video signals according to the refresh rate switching instruction;

combining the two first video signals into the third video signal, wherein a (2L−1)th frame image in the third video signal is the same as a 2L-th frame image, and is the same as an L-th frame image in the first video signal, and L is a positive integer;

wherein the step of causing the third video signal to be generated into the second video signal comprises:

acquiring image data of odd-numbered columns of a M-th frame image in the third video signal and image data of even-numbered columns of a (M+1)th frame image in the third video signal, wherein M is a positive integer; and generating the second video signal according to the image data of the odd-numbered columns of the M-th frame image and the image data of the even-numbered columns of the (M+1)th frame image, wherein image data of a M-th frame image in the second video signal comprises the image data of the odd-numbered columns of the M-th frame image in the third video signal, and image data of a (M+1)th frame image in the second video signal comprises the image data of the even-numbered columns of the (M+1)th frame image in the third video signal.

3. The display panel driving method of claim 2, wherein the step of outputting the scan driving signal corresponding to the second refresh rate and the second video signal to the plurality of pixels of the display panel comprises:

outputting image data of P columns of a N-th frame image in the second video signal to pixels of P odd-numbered columns of the display panel within a driving period of the N-th frame image according to the second refresh rate, and outputting a common voltage to pixels of P even-numbered columns of the display panel within the driving period of the N-th frame image; and outputting image data of P columns of a (N+1)th frame image in the second video signal to the pixels of the P even-numbered columns of the display panel within a driving period of the (N+1)th frame image, and outputting the common voltage to the pixels of the P odd-numbered columns of the display panel within the driving period of the (N+1)th frame image;

wherein N and P are both positive integers.

4. The display panel driving method of claim 2, wherein the step of outputting the scan driving signal corresponding to the second refresh rate and the second video signal to the plurality of pixels of the display panel comprises:

outputting image data of P columns of a N-th frame image in the second video signal to pixels of P odd-numbered columns of the display panel within a driving period of the N-th frame image according to the second refresh rate, and disconnecting a current path between a source drive circuit of the display panel and pixels of P even-numbered columns of the display panel within the driving period of the N-th frame image; and outputting image data of P columns of a (N+1)th frame image in the second video signal to the pixels of the P even-numbered columns of the display panel within a driving period of the (N+1)th frame image, and disconnecting a current path between the source drive circuit and the pixels of the P odd-numbered columns of the display panel within the driving period of the (N+1)th frame image;

wherein N and P are both positive integers.

5. The display panel driving method of claim 1, wherein the display panel further comprises a plurality of scan lines and a plurality of data lines, one of the scan lines is electrically connected to one row of pixels, and one of the data lines is electrically connected to one column of pixels.

6. The display panel driving method of claim 1, wherein the display panel further comprises a gate drive circuit and a source drive circuit; a scan start signal, a reset signal, a clock signal are input into the gate drive circuit; and a high-level of one of the scan start signal and the reset signal is the same as a high-level of the clock signal.

7. The display panel driving method of claim 1, wherein according to a timing control signal corresponding to the second refresh rate, the scan driving signal corresponding to the second refresh rate is output to a plurality of rows of pixels of the display panel.

8. The display panel driving method of claim 1, wherein according to a timing control signal corresponding to the second refresh rate, the second video signal is output to a plurality of columns of pixels of the display panel.

9. The display panel driving method of claim 1, wherein a duty cycle of the scan driving signal corresponding to the second refresh rate is equal to a duty cycle of the scan driving signal corresponding to the first refresh rate; and/or wherein a pulse amplitude of the scan driving signal corresponding to the second refresh rate is greater than a pulse amplitude of the scan driving signal corresponding to the first refresh rate.

10. The display panel driving method of claim 1, wherein in image data of odd-numbered frames, image data corresponding to pixels of odd-numbered columns of the display panel is retained, and image data corresponding to pixels of even-numbered columns of the display panel is removed; and in image data of even-numbered frames, the image data corresponding to the pixels of the even-numbered columns of the display panel is retained, and the image data corresponding to the pixels of the odd-numbered columns of the display panel is removed.

11. The display panel driving method of claim 1, wherein in image data of odd-numbered frames, a voltage of image data corresponding to pixels of even-numbered columns of the display panel is assigned as a voltage of a common electrode of the display panel; and in image data of the even-numbered frames, a voltage of image data corresponding to pixels of odd-numbered columns of the display panel is assigned as the voltage of the common electrode of the display panel.

12. A display device, comprising a display panel and a control chip, wherein the display panel comprises a gate drive circuit, a source drive circuit, and a plurality of pixels, the control chip is electrically connected to the gate drive circuit and the source drive circuit of the display panel, the gate drive circuit and the source drive circuit are both electrically connected to a plurality of the pixels;

the control chip is configured to receive a refresh rate switching instruction, is configured to cause an input first video signal with a first image resolution and a first frame rate to be generated into a second video signal with a second image resolution and a second frame rate according to the refresh rate switching instruction, and is configured to output a scan driving signal corresponding to the second refresh rate and the second video signal to the plurality of pixels of the display panel through the gate drive circuit and the source drive circuit; and the refresh rate switching instruction is configured to control the display panel to switch from a first refresh rate to a second refresh rate;

wherein the second refresh rate is twice the first refresh rate, and the second frame rate is twice the first frame rate;

the control chip is configured to cause one first video signal to be generated into two first video signals according to the refresh rate switching instruction, is configured to combine the two first video signals into the third video signal, is configured to acquire image data of odd-numbered columns of a M-th frame image in the third video signal and image data of even-numbered columns of a (M+1)th frame image in the third video signal, and is configured to generate the second video signal according to the image data of the odd-numbered columns of the M-th frame image and the image data of the even-numbered columns of the (M+1)th frame image;

wherein a (2L−1)th frame image in the third video signal is the same as a 2L-th frame image, and is the same as an L-th frame image in the first video signal, and L and M are both positive integers; image data of a M-th frame image in the second video signal comprises the image data of the odd-numbered columns of the M-th frame image in the third video signal, and image data of a (M+1)th frame image in the second video signal comprises the image data of the even-numbered columns of the (M+1)th frame image in the third video signal.

13. The display device of claim 12, wherein the source drive circuit comprises a data register and a line latch, the data register is electrically connected to the line latch, and the line latch is electrically connected to a plurality of columns of pixels of the display panel;

the data register is configured to output image data of P columns of a N-th frame image in the second video signal to pixels of P odd-numbered columns of the display panel within a driving period of the N-th frame image according to the second refresh rate, is configured to output a common voltage to pixels of P even-numbered columns of the display panel within the driving period of the N-th frame image, is configured to output image data of P columns of a (N+1)th frame image in the second video signal to the pixels of the P even-numbered columns of the display panel within a driving period of the (N+1)th frame image, and is configured to output the common voltage to the pixels of the P odd-numbered columns of the display panel within the driving period of the (N+1)th frame image; or the data register or the line latch is configured to output the image data of P columns of the N-th frame image in the second video signal to the pixels of the P odd-numbered columns of the display panel within the driving period of the N-th frame image according to the second refresh rate, is configured to disconnect a current path between the source drive circuit of the display panel and the pixels of the P even-numbered columns of the display panel within the driving period of the N-th frame image, is configured to output the image data of P columns of the (N+1)th frame image in the second video signal to the pixels of the P even-numbered columns of the display panel within the driving period of the (N+1)th frame image, and is configured to disconnect a current path between the source drive circuit and the pixels of the P odd-numbered columns of the display panel within the driving period of the (N+1)th frame image;

wherein N and P are both positive integers.

14. The display device of claim 12, wherein the source drive circuit comprises an output controller, and the output controller is electrically connected to a plurality of columns of pixels;

the output controller is configured to connect a current path between the source drive circuit and pixels of P odd-numbered columns of the display panel within a driving period of the N-th frame image, is configured to disconnect a current path between the source drive circuit and pixels of P even-numbered columns of the display panel, is configured to connect the current path between the source drive circuit and the pixels of the P even-numbered columns of the display panel within a driving period of the (N+1)th frame image, and is configured to disconnect the current path between the source drive circuit and the pixels of the P odd-numbered columns of the display panel.

15. The display device of claim 12, wherein the control chip is configured to scale the first video signal to a fourth video signal with the second image resolution and the first frame rate according to the refresh rate switching instruction, is configured to generate two fourth video signals from one fourth video signal, and is configured to combine the two fourth video signals into the second video signal;

wherein a (2L−1)th frame image in the second video signal is the same as a 2L-th frame image, and is the same as an L-th frame image in the fourth video signal, and L is a positive integer.

16. The display device of claim 15, wherein the source drive circuit is configured to replicate image data of P columns of a Q-th frame image in the second video signal into image data of 2P columns, and is configured to output the image data of the 2P columns to pixels of the 2P columns of the display panel within a driving period of the Q-th frame image;

wherein image data of the same two columns in the image data of the 2P columns obtained after replicating is output to pixels of two adjacent columns of the display panel, and P and Q are both positive integers.

17. A display panel driving method, comprising:

receiving a refresh rate switching instruction, wherein the refresh rate switching instruction is configured to control a display panel to switch from a first refresh rate to a second refresh rate;

causing an input first video signal with a first image resolution and a first frame rate to be generated into a second video signal with a second image resolution and a second frame rate according to the refresh rate switching instruction; and outputting a scan driving signal corresponding to the second refresh rate and the second video signal to a plurality of pixels of the display panel;

wherein the step of causing the input first video signal with the first image resolution and the first frame rate to be generated into the second video signal with the second image resolution and the second frame rate according to the refresh rate switching instruction comprises:

scaling the first video signal to a fourth video signal with the second image resolution and the first frame rate according to the refresh rate switching instruction;

generating two fourth video signals from one fourth video signal;

combining the two fourth video signals into the second video signal, wherein a (2L−1)th frame image in the second video signal is the same as a 2L-th frame image, and is the same as an L-th frame image in the fourth video signal, and L is a positive integer.

18. The display panel driving method of claim 17, wherein the step of outputting the scan driving signal corresponding to the second refresh rate and the second video signal to the plurality of pixels of the display panel comprises:

replicating image data of P columns of a Q-th frame image in the second video signal into image data of 2P columns; and outputting the image data of the 2P columns to pixels of the 2P columns of the display panel within a driving period of the Q-th frame image, wherein image data of the same two columns in the image data of the 2P columns obtained after replicating is output to pixels of two adjacent columns of the display panel, and P and Q are both positive integers.

* * * * *